A. T. CLARK.

Mill for Grinding Grain.

No. 481. Reissued Aug. 4, 1857.

N. PETERS, Photo-Lithographer, Washington, D. C.

UNITED STATES PATENT OFFICE.

ALFRED T. CLARK, OF LANCASTER, PENNSYLVANIA.

IMPROVEMENT IN DISTRIBUTING APPARATUS OF FLOURING-MILLS.

Specification forming part of Letters Patent No. 17,667, dated June 30, 1857; Reissue No. 481, dated August 4, 1857.

*To all whom it may concern:*

Be it known that I, ALFRED T. CLARK, of Lancaster, in the county of Lancaster and State of Pennsylvania, have invented an Improvement in Flouring-Mills; and I do hereby declare that the following is a full, clear, and exact description of the principle or character which distinguishes it from all other things before known, and of the usual manner of making, modifying, and using the same, reference being had to the accompanying drawings, of which—

Figure 1:
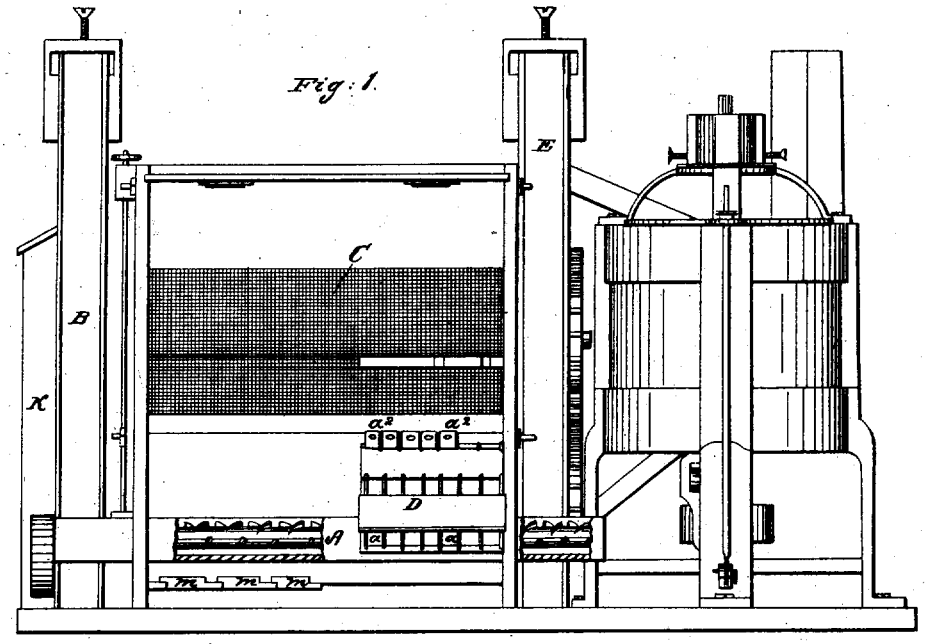
Figure 2:
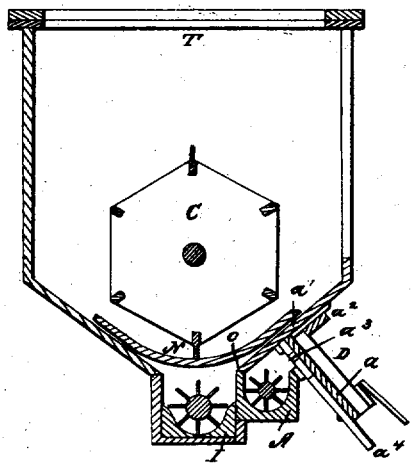
Figure 3:
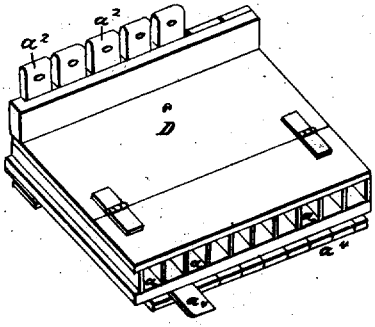

Figure 1 is a perspective view of the bolting-machine and the grinding-mill. Fig. 2 is a vertical cross-section of the bolting-machine, taken through that part containing the double sets of valves and spouts. Fig. 3 is an enlarged perspective detached view of the double sets of valves and spouts.

My improvement relates to the bolting, separation, and subsequent mixing of the different qualities of fine flour and middlings with the other qualities of flour, whereby I obtain an excellent "yield" of flour from the grain, and the grinding parts may be such as those in common use for portable flouring-mills.

A is the first conveyer, which receives the flour from the grinding-mill. The conveyer is open at the top, so as to cool the flour by exposure to the air, and for another purpose to be hereinafter explained when describing the functions of the "double set of spouts and valves." The flour is delivered from this conveyer into the bottom of the trunk B, whence it is raised by an elevator of the usual construction and conducted, by a spout, in the usual manner, into the open end of the bolt C. The conveyer L receives the flour from the bolt C. The different qualities of extra flour and superfine flour are discharged by the conveyer L through apertures which are opened and closed by the valves *m m*. The fine flour, middlings, and offal fall upon the supplemental bottom N. Under the same end of the bolt are arranged in succession the several spouts, D, opening into the bolting-chamber, for the purpose of discharging the fine flour, middlings, and offal separately into their proper receptacles. Adjacent to this end of the bolt is the trunk E, within which is the returning-elevator, which raises and delivers to the grinding-mill the middlings or whatever is to be ground over again, according to the usual practice in mills.

My mode of separating the various qualities of fine flour, middlings, and offal is as follows.

D is the separator, being a trunk or box divided into as many compartments or spouts, *a a*, as may be deemed necessary, each of which spouts opens into the bolting-chamber, as seen at $a^1$, Fig. 2. Each of these tubes is provided with a valve, $a^2$, which regulates the discharge of the fine flour and offal through the spout. These spouts are also provided with apertures $a^3$ $a^3$ on their under sides for discharging the fine flour or any required portion of the offal into the conveyer A. These apertures are opened and closed by valves $a^4$ for regulating this discharge, and the operation of the separator is as follows: Whatever quality of fine flour or offal is to be run off is discharged at *a*, the valve $a^2$ being open and the valve $a^4$ being shut, and if it is to be returned to the bolt for further sifting the valves $a^2$ and $a^4$ are both open; and when it is necessary to return the middlings or any other quality to the mill the valve $a^2$ is shut, and the said middlings fall through the aperture *o* into the conveyer L, which conducts the middlings into the returning-elevator P, which raises and delivers it to the grinding mill.

It will be readily seen that by the double sets of spouts and valves I obtain great control over the separation and the subsequent mixing of the fine flour and middlings in various proportions and of various qualities, thereby producing an excellent "yield" of flour from the grain.

I am aware that a single series of spouts has been connected with a bolt, as in the patent of E. and J. M. Clark, patented June 6, 1854; and I shall not, therefore, lay any claim to this device, but intend to limit my claim to the double series of spouts and valves so arranged in connection with the bolt and the open conveyer A as to give me facilities for separation and mixing not attainable by a single series, as hereinafter more particularly specified.

What I claim as my invention and improvement is—

1. The double series of spouts and valves arranged and connected with the bolting-chamber, substantially as herein set forth.

2. The arrangement of the conveyer A, in combination with the double series of valves and spouts, as set forth.

ALFRED T. CLARK.

Witnesses:

JOHN S. HOLLINGSHEAD,

JEDH. GITTINGS.